US007231710B2

(12) United States Patent
Boa et al.

(10) Patent No.: US 7,231,710 B2
(45) Date of Patent: Jun. 19, 2007

(54) APPARATUS FOR SECURING WIRE CONNECTORS

(76) Inventors: Neil Edward Boa, 96 Tuscany Hills Circle NW., Calgary, Alberta (CA) T3L 2E5; Robbie Lee Snowden, 3109-49th Street SW., Calgary, Alberta (CA) T3E 6P8

( * ) Notice: Subject to any disclaimer, the term of this patent is extended or adjusted under 35 U.S.C. 154(b) by 366 days.

(21) Appl. No.: 11/015,304

(22) Filed: Dec. 20, 2004

(65) Prior Publication Data

US 2006/0134932 A1 Jun. 22, 2006

(51) Int. Cl.
*B23P 19/00* (2006.01)

(52) U.S. Cl. ............................ 29/748; 29/745; 29/747; 29/752; 29/754; 29/876; 72/391.6; 227/112

(58) Field of Classification Search .................. 29/729, 29/739, 745–749, 752–755, 240, 243.526, 29/243.53, 876, 758; 72/391.6, 391.8, 114; 81/121.1, 124.3; 174/174, 87, 84 S; 7/107; 439/877, 879

See application file for complete search history.

(56) References Cited

U.S. PATENT DOCUMENTS 3,787,948 A 1/1974 Runge
3,810,288 A * 5/1974 Caveney et al. ........... 29/564.4
4,365,527 A 12/1982 Kruse
4,823,650 A 4/1989 Tuttle
4,840,579 A * 6/1989 Heng et al. ................. 439/395
4,858,312 A 8/1989 Van Naarden
5,784,935 A 7/1998 Korinek
5,832,796 A 11/1998 Chopra
5,974,916 A 11/1999 Lassiter
6,198,049 B1 3/2001 Korinek
6,401,325 B1 * 6/2002 Fidtje ........................ 29/566.4
6,684,470 B1 * 2/2004 Joux ..................... 29/243.521

FOREIGN PATENT DOCUMENTS

CA 1007900 4/1977
CA 1026901 2/1978
CA 1110885 10/1981
CA 2191830 6/1997
CA 2209676 10/2000

* cited by examiner

*Primary Examiner*—Minh Trinh
(74) *Attorney, Agent, or Firm*—Anthony C. Edwards

(57) ABSTRACT

An apparatus for securing wire connectors includes a rotatable cylindrical member defining at least one chamber configured to store at least one wire connector. A frame supporting the rotatable cylindrical member is detachably mountable on a drill. A dispensing housing mounted on the frame receives the wire connector from the chamber and dispenses the wire connector though an outlet after a rotator twistably engages and secures the wires onto the wire connector. The rotator is selectively rotatable by actuating the drill when the end of a wire is inserted into the wire connector, the wire connector thereby engaging the rotator.

20 Claims, 8 Drawing Sheets

APPARATUS FOR SECURING WIRE CONNECTORS

FIELD OF THE INVENTION

This invention relates to an apparatus for securing wire connectors.

BACKGROUND OF THE INVENTION

Wire connectors are typically plastic cone shaped devices that are open at one end to receive electrical wires. The interior of such cone shaped devices are threaded or contain a helical coil spring that they may be twisted onto the ends of electrically conductive wires. The ends of the wires are stripped of their insulation and twisted together. The connector is twisted on the ends of the wires to secure the electrical connection between the wires.

Devices for attaching wire connectors are available and known in the art. For example, U.S. Pat. No. 4,365,527 describes an automatic wire connector attaching apparatus which includes an elongated housing having an inlet for receiving the connectors and an outlet for discharging the connectors. The connectors are received in a rotatable but axially fixed hollow drive shaft. A concentric sleeve, which surrounds the drive shaft, is axially movable towards the outlet by manually operated cam means. Such axial movement causes a plurality of fingers secured to one end of the sleeve to grip a connector located adjacent the outlet. An electric motor rotates the drive shaft and the sleeve, causing wires inserted through the outlet to twistably engage to one another and secure to the threaded inner surface of the connector.

Having to obtain a separate tool that can only perform a single function, namely, automatically attaching wire connectors, is costly and unnecessary when other existing tools may be adapted to perform the same function. Therefore, it is an object to provide an apparatus that is capable of being attached to any rotating means, such as a drill or a rotary tool, for securing wire connectors onto electric wires.

SUMMARY OF THE INVENTION

The apparatus for securing wire connectors according to the present invention eliminates the need for a separate tool to secure wire connectors by providing an attachment capable of being mounted on a conventional rotating means, such as a hand drill or rotary tool, to secure wire connectors onto ends of wires. The apparatus is therefore a more cost effective option as it is an attachment having flexible securing means so that the apparatus may be mounted onto any rotating means, which is a common tool that a user typically owns. Furthermore, the operation of the apparatus is based on a simple spring mechanism, which requires less maintenance compared to a conventional apparatus having a plurality of complex mechanical parts cooperating with each other.

The apparatus for securing wire connectors according to the present invention thus includes a rotatable cylindrical member defining at least one chamber, the chamber configured to store at least one wire connector. A frame supporting the rotatable cylindrical member is detachably mountable on a rotating means. A dispensing member mounted on the frame defines a wire connector channel to receive the wire connector from the chamber. The dispensing member further defines an outlet wherein the wire connector exits the apparatus. A rotator, which is selectively rotatable by actuating the rotating means, engages the wire connector when the wire is inserted through the outlet into the wire connector, thereby urging the wire connector to engage the rotator. Actuation of the rotating means rotates the rotator to twistably engage and secure the wire onto the wire connector.

In an embodiment of the present invention, the rotatable cylindrical member defines a plurality of chambers wherein each chamber defines an aperture at a first end to releaseably receive a plurality of wire connectors. A first spring disposed within each of the plurality of chambers at a second end urge the plurality of wire connectors from the chamber through the aperture and into the wire connector channel of the dispensing member. The wire connector channel widens towards the outlet such that the wire connectors may be aligned to receive the wire and engage the rotator prior to the wire connectors exiting through the outlet.

The cylindrical member is selectively rotatable with respect to an axle extending centrally through the cylindrical member such that an aperture of any one of the plurality of chambers may be positioned to urge the plurality of wire connectors into the wire connector channel. The axle is pivotally coupled with a rear plate of the frame at a first end and detachably coupled with an axle receiving recess defined by the dispensing member at a second end. A second spring encompassing the axle is attached to the rear plate at a first end and attached to a first side of a disc at a second end. The axle journals through the disc such that a second side of the disc is firmly biased against a rear surface of the rotatable cylindrical member when the second spring is expanded, the second spring thereby exerting force against the rotatable cylindrical member. A plurality of bearings positioned on the rear surface of the rotatable cylindrical member frictionally engage a plurality of corresponding receiving recesses positioned on the second side of the disc until the plurality of bearings are displaced from the plurality of corresponding receiving recesses when force is applied to rotate the rotatable cylindrical member. The plurality of bearings frictionally re-engages the plurality of corresponding receiving recesses when an aperture of one of the plurality of chambers is aligned with the wire connector channel.

When the second spring is expanded, the force exerted by the second spring secures the second end of the axle within the axle receiving recess such that the aperture of one of the plurality of chambers is aligned with the wire connector channel to receive the plurality of wire connectors. When the second spring compresses, the second end of the axle is released from the axle receiving recess, thereby enabling the axle to pivot about the first end of the axle such that rotatable cylindrical member may be displaced to enable the insertion of the wire connectors into the plurality of chambers. A retractable shutter positioned over each aperture of the plurality of chambers retains the plurality of wire connectors within the plurality of chambers when the rotatable cylindrical member is displaced. The retractable shutter retracts when the axle re-engages the axle receiving recess thereby enabling the first spring to urge the plurality of wire connectors into the wire connector channel.

The frame includes a cylinder support for supporting the rotatable cylindrical member and a first and a second securing means. The cylinder support is connected with the rear plate at a first end and a face plate at a second end such that the frame may be detachably mountable on the rotating means by the first and second securing means. In an embodiment of the invention, the first and second securing means include adjustable clamps for securing the frame onto a drill. The drill includes a drill bit insertable in a drill bit keyhole defined by the face plate. The rotator, which is preferably a cap configured to encase and frictionally engage a closed end of the wire connector such that the rotator may rotate the wire connector to secure the wire, is connected with the face plate. When the drilling means is actuated, rotation of the drill bit inserted in the drill bit keyhole rotates a first gear, the first gear causing a second gear to rotate. The rotator, which is mounted on the second gear, thereby rotates at a lower rate, that is a lower rpm, than the drill bit. The face plate may also include a wire stripper which is slidably mountable on a bottom end of the face plate to strip the end of the wire.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF EMBODIMENTS OF THE INVENTION

Figure 1:
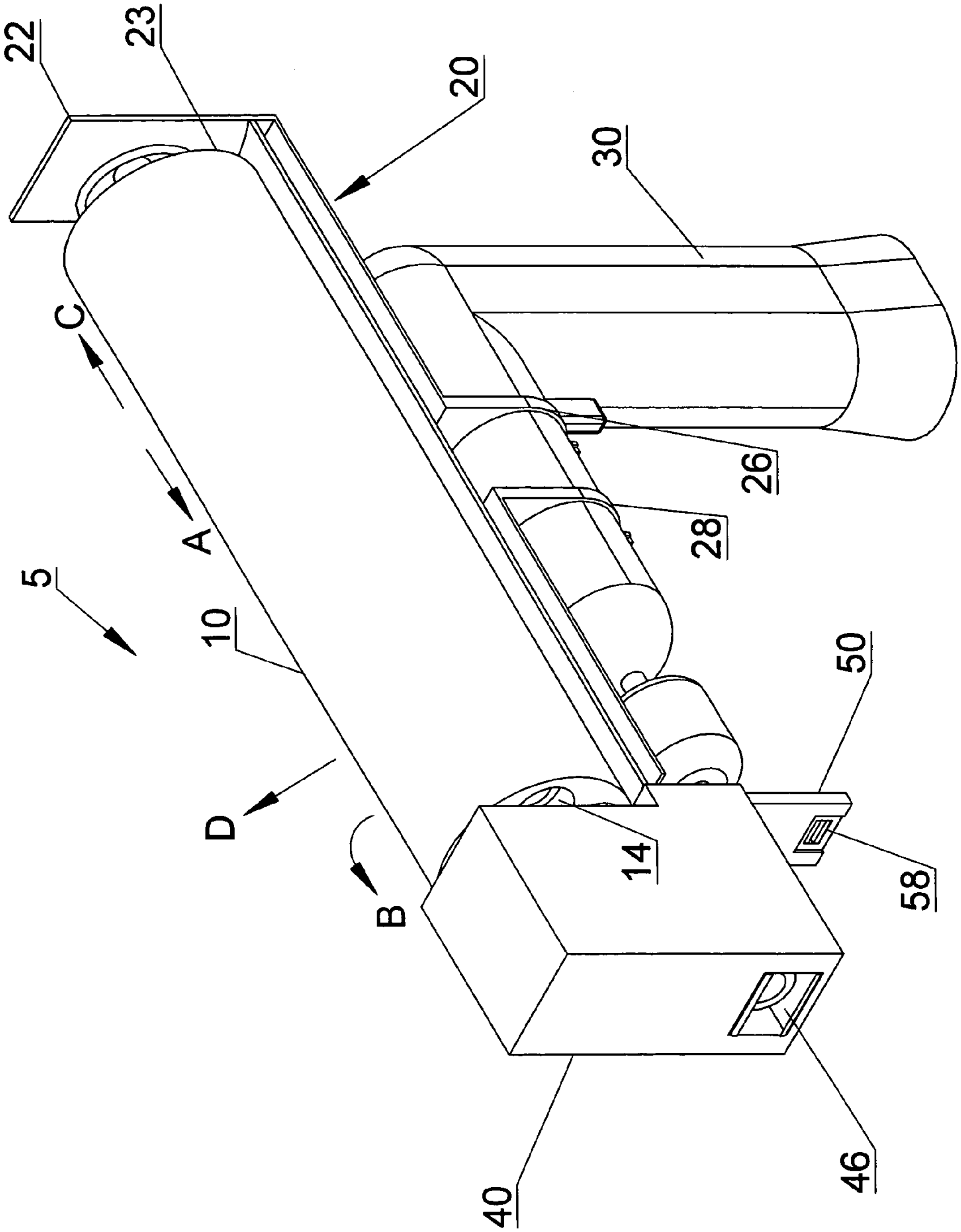
FIG. 1 is a side perspective view of the apparatus for securing wire connectors according to the present invention.
Figure 2:
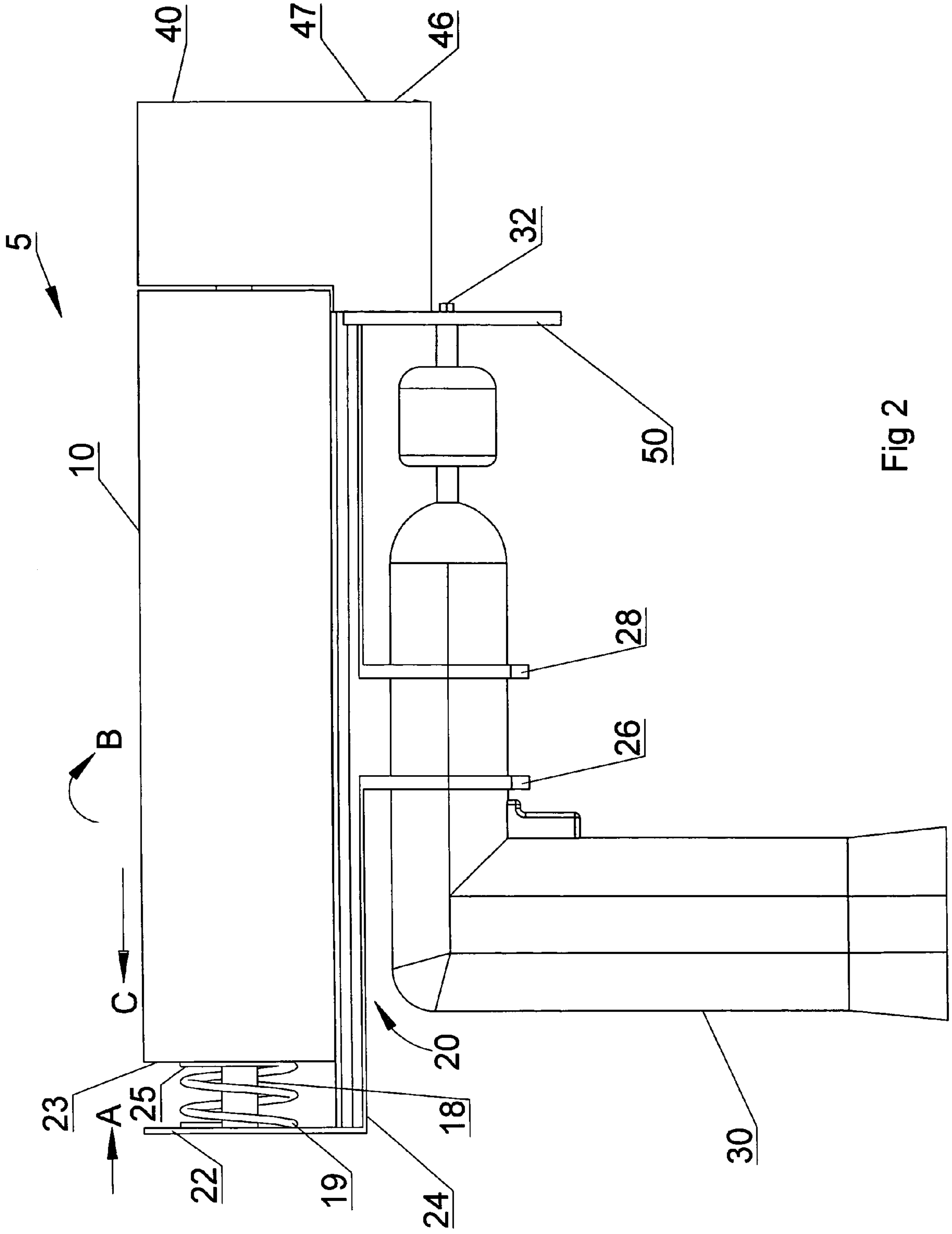
FIG. 2 is a side view of the apparatus for securing wire connectors shown in FIG. 1.
Figure 3:
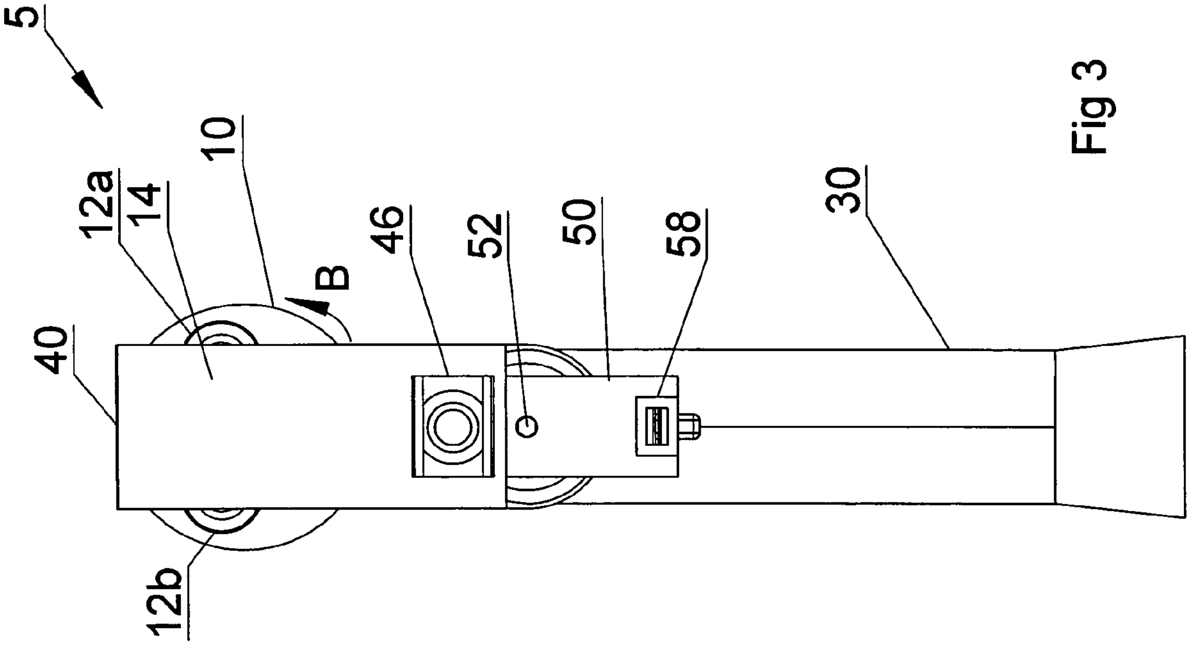
FIG. 3 is a front view of the apparatus for securing wire connectors shown in FIG. 1.
Figure 4:
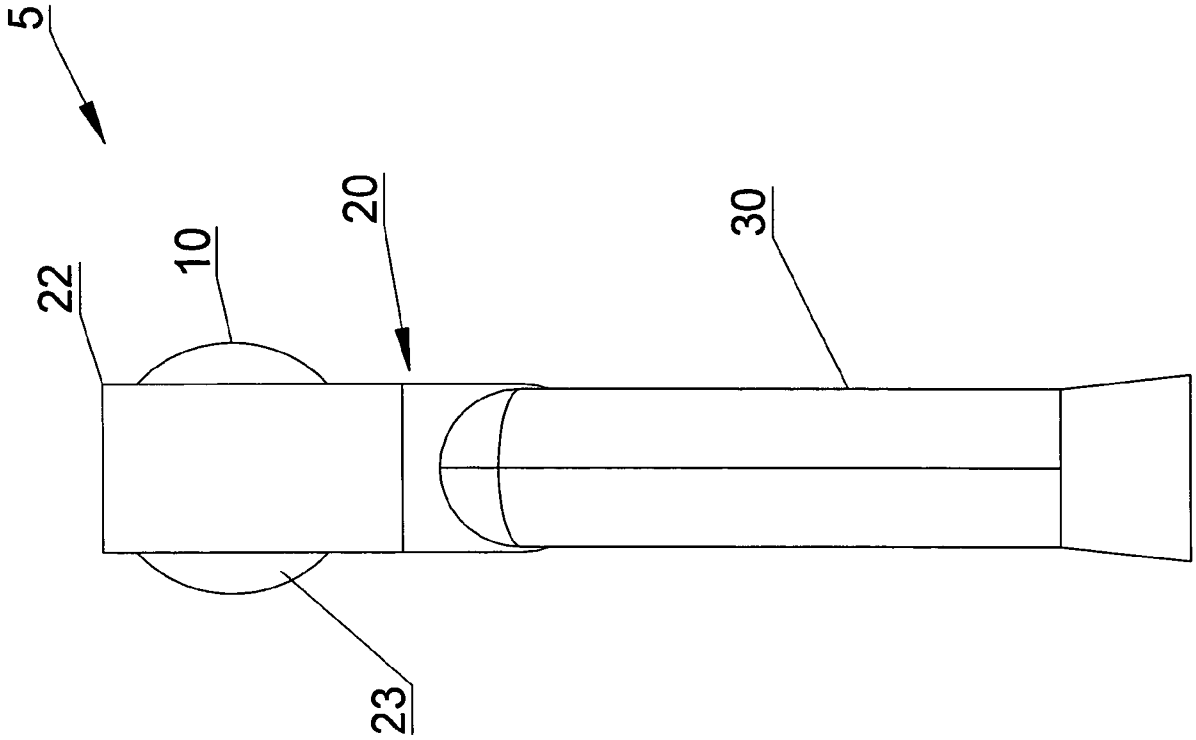
FIG. 4 is a rear view of the apparatus for securing wire connectors shown in FIG. 1.
Figure 5:
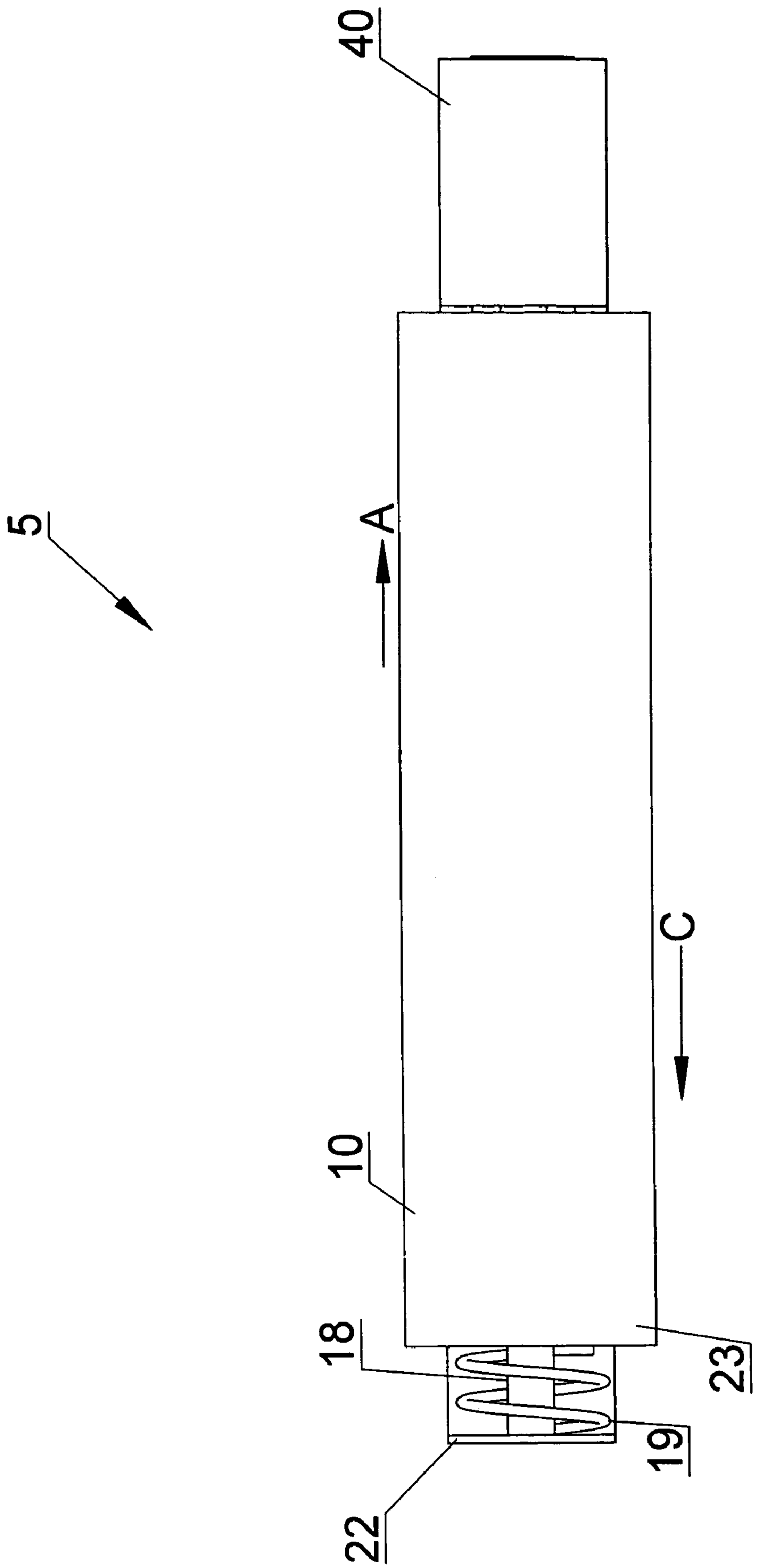
FIG. 5 is a plan view of the apparatus for securing wire connectors shown in FIG. 1.
Figure 6:
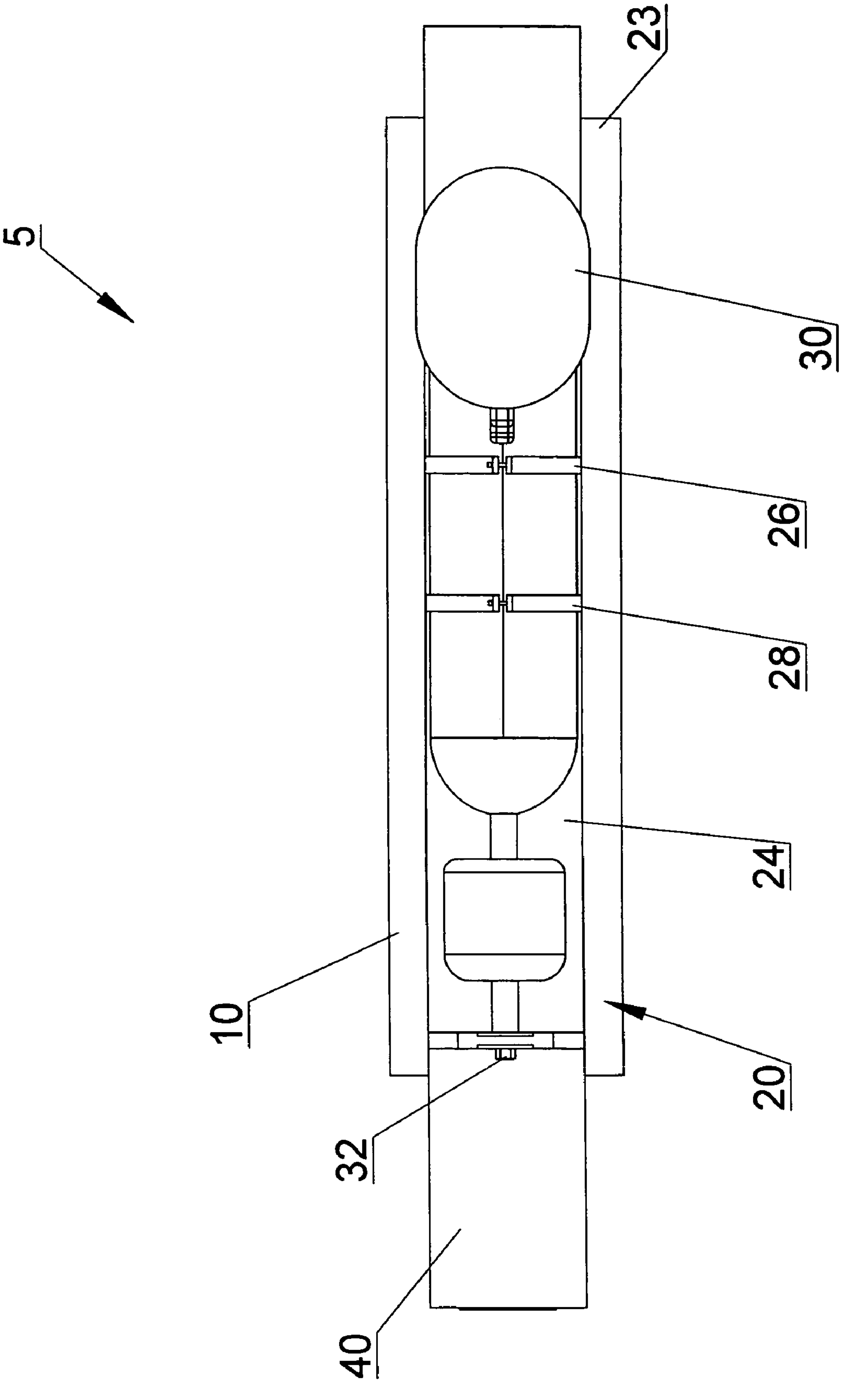
FIG. 6 is a bottom view of the apparatus for securing wire connectors shown in FIG. 1.
Figure 7:
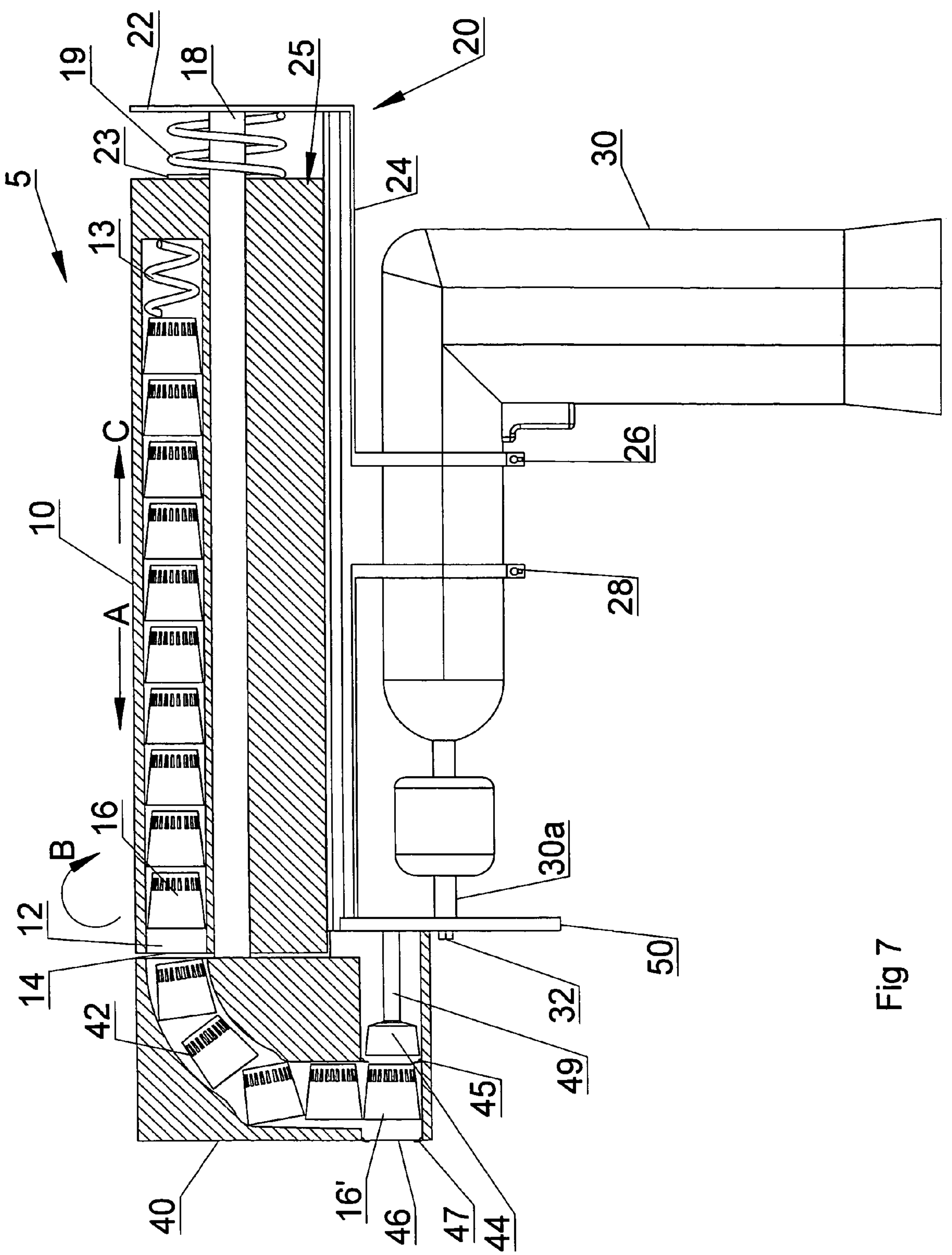
FIG. 7 is a side cross-sectional view of the apparatus for securing wire connectors shown in FIG. 1.
Figure 8:
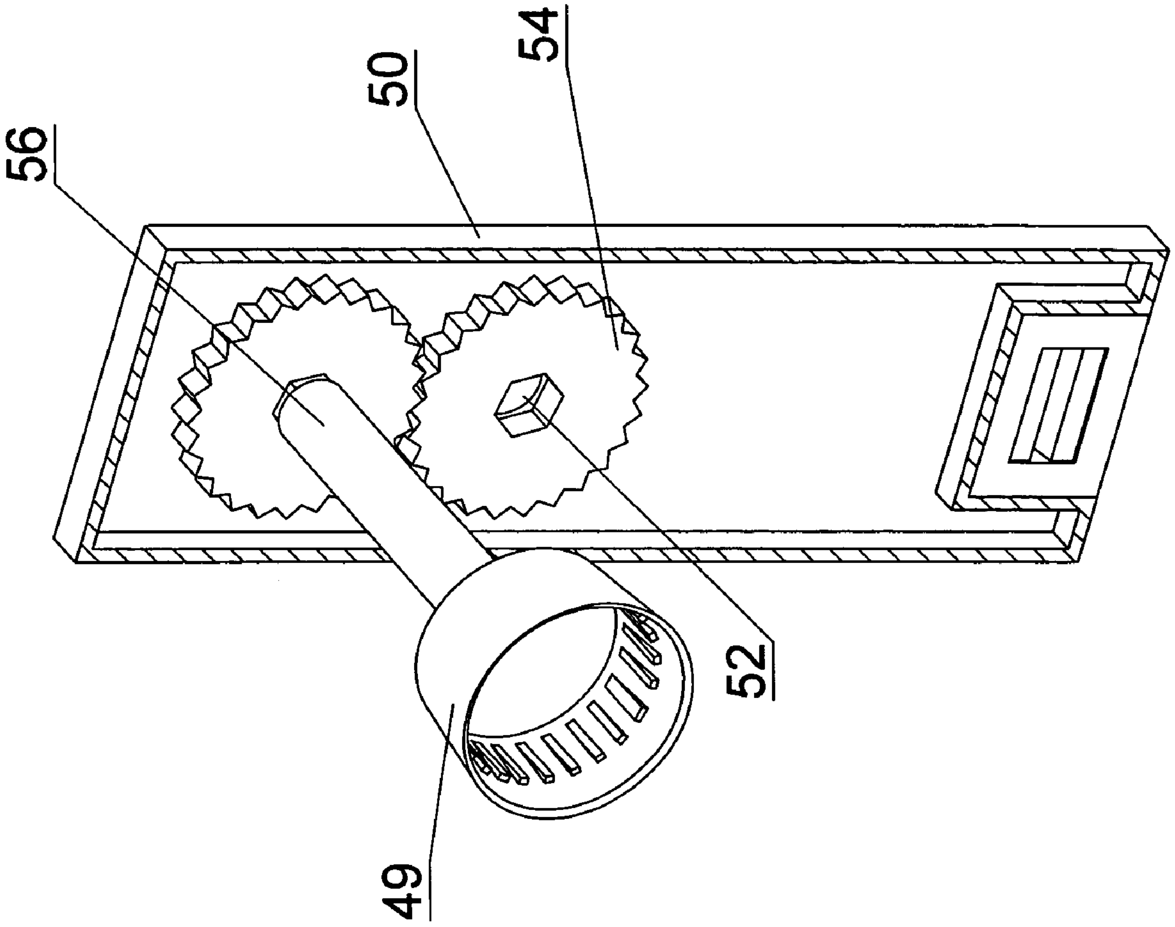
FIG. 8 is a side perspective view of the wire connector twisting mechanism of the apparatus for securing wire connectors.

With reference to FIGS. 1 to 8 wherein similar characters of reference denote corresponding parts in each view, an apparatus 5 according to the present invention includes a rotatable cylindrical member 10 supported by a frame 20 wherein frame 20 is mountable on a rotating means such as a drill 30. A dispensing housing 40 defining a wire connector channel 42 receives a wire connector 16 from rotatable cylindrical member 10. Dispensing housing 40 further defines an outlet 46 wherein the ends of wires are inserted into a downstream-most wire connector 16', urging wire connector 16' to engage a rotator 49. Rotator 49 is selectively rotatable by drill 30 rotating drill bit 30*a* to twistably engage and secure the ends of wires to wire connector 16.

Rotatable cylindrical member 10 defines at least one chamber 12 having an aperture 14 at a first end of chamber 12 to receive and dispense wire connector 16. Chamber 12 is adapted to store a plurality of wire connectors 16 disposed end-to-end within chamber 12 until they are released into wire connector channel 42. A spring 13 disposed within chamber 12 at a second end of chamber 12 urges wire connectors 16 out through aperture 14 at the first end of the chamber and into wire connector 42 of dispensing housing 40.

Rotatable cylindrical member 10 is selectively rotatable with respect to an axle 18. Axle 18 extends through the centre of rotatable cylindrical member 10 and is pivotally coupled at a first end with a rear plate 22. At a second end, axle 18 is detachably coupled with an axle receiving recess defined by dispensing housing 40. Encompassing the first end of axle 18 is a spring 19 which is coupled with rear plate 22 at a first end and coupled with a rear surface 23 of rotatable cylindrical member 10 at a second end. In an embodiment of the present invention, second end of spring 19 is coupled with a first side of a disc 25 wherein axle 18 journals through the centre of disc 25. Rear surface 23 defines a recess configured to mate with a second side of disc 25 as described below. When expanded, spring 19 exerts force on rear surface 23 of rotatable cylindrical member 10 in direction A such that the second side of disc 25 is firmly biased against rear surface 23, thereby securing and maintaining the connection between the second end of axle 18 within the axle receiving recess. By maintaining such connection, aperture 14 of chamber 12 may be aligned with wire connector channel 42 such that wire connectors 16 may be urged from chamber 12 and released into dispensing housing 40. In an embodiment of the invention wherein rotatable cylindrical member 10 includes a plurality of chambers 12, when all the wire connectors 16 disposed in a first chamber 12*a* have been released into dispensing housing 40, rotatable cylindrical member 10 may be rotated in direction B to align aperture 14 of a second chamber 12*b* with wire connector channel 42 such that wire connectors 16 in second chamber 12*b* may be released into wire connector channel 42. To ensure and maintain the alignment of aperture 14 of chamber 12 with wire connector channel 42, a plurality of bearings (not shown) may be positioned on rear surface 23 so as to frictionally engage a plurality of corresponding receiving recesses defined by the second side of disc 25. For example, to rotate rotatable cylindrical member 10 to align wire connector channel 42 with one of the plurality of chambers 12, sufficient force must be applied to rotate rotatable cylindrical member 10 in direction B relative to disc 25 to overcome the frictional engagement between the bearings and their corresponding receiving recesses defined by disc 25. Once the bearings have been displaced, rotatable cylindrical member 10 may be rotated relative to disc 25 to align aperture 14 of chamber 12 with wire connector channel 42. When aperture 14 is aligned with wire connector channel 42, the bearings re-engage with their corresponding receiving recesses. The plurality of bearings and receiving recesses are positioned on rear surface 23 and disc 25, respectively, such that when aperture 14 of any one of the plurality of chambers 12 is aligned with wire connector channel 42, the bearings re-engage with the corresponding receiving recesses and prevent further rotation unless sufficient force is applied to further rotate rotatable cylindrical member 10.

When spring 19 is compressed by retracting rotatable cylindrical member 10 towards rear plate 22 in direction C, the second end of axle 18 detaches from the axle receiving recess defined by dispensing housing 40, thereby allowing rotatable cylindrical member 10 to be displaced vertically in direction D by pivoting about the first end of axle 18. In such displaced position, aperture 14 of the plurality of chambers 12 are exposed so that wire connectors 16 may be inserted into the plurality of chambers 12. A retractable spring actuated shutter which covers aperture 14 when rotatable cylindrical member 10 is in the raised position retains wire connectors 16 within chamber 12 as wire connectors 16 are being inserted into the plurality of chambers 12. When first chamber 12*a* receives the maximum number of wire connectors 16, rotatable cylindrical member 10 may be rotated to position aperture 14 of second chamber 12*b* to receive and retain wire connectors 16. When the second end of axle 18 re-attaches to the axle receiving recess, a projection mounted on dispensing housing 40 and positioned above wire connector channel 42 engages the spring that actuates the shutter through an aperture defined by rotatable cylindrical member 10 such that the shutter retracts and enables wire connectors 16 to be urged through aperture 14 and into wire connector channel 42.

Wire connectors 16 are disposed in chamber 12 such that the closed end of wire connectors 16 is inserted into chamber 12 first. In an embodiment of the present invention, wire connectors 16 disposed in chamber 12 are the conventional plastic cone-shaped wire connectors that are open at a first end to receive electrical wires, closed at their opposite second end, and have a threaded interior that may twistably engage and secure the ends of wires together.

Frame 20 comprises rear plate 22, a cylinder support 24, a first and a second securing means 26 and 28, and face plate 50. Preferably, cylinder support 24 is a trough adapted to receive and hold rotatable cylindrical member 10. A first end of cylinder support 24 is connected with rear plate 22 and a second end of cylinder support 24 is connected with face plate 50. Rear plate 22 is connected with a first end of frame 20 and face plate 50 is connected with a second end of frame 20 such that frame 20 may be detachably mountable on rotating means 30 as a unit by way of first and second securing means 26 and 28. In an embodiment of the invention, first and second securing means 26 and 28 may be slidably adjustable along frame 20 at a first end of each securing means 26 and 28 by way of set screws positioned to accommodate the particular dimensions of rotating means 30. First and second securing means 26 and 28 may also be detachably mountable on frame 20. At a second end, first and second securing means 26 and 28 may include a clamp member or any other mounting means known in the art. Preferably, first and second securing means 26 and 28 forms clamps at a second end to secure frame 20 around the body of rotating means 30.

Rotating means 30 may be any means capable of facilitating the rotation of a rotator 49. Because first and second securing means 26 and 28 are adjustable, frame 20 may be secured to any rotating means available in the art, such as a rotary tool. In an embodiment of the present invention, rotating means 30 is a conventional hand held drill having a drill bit 32 that may be inserted into a drill bit keyhole 52 defined by face plate 50. When rotating means 30 is actuated, drill bit 32 inserted in drill bit keyhole 52 rotates a pair of gears described below, thereby causing rotator 49 to rotate. Rotator 49 engages the closed end of wire connector 16 and when rotated, rotator 49 twistably engages wires inserted through an outlet 46 defined by dispensing housing 40 together and secures such ends to the threaded inner surface of wire connector 16.

Dispensing housing 40, which is connected to face plate 50, defines wire connector channel 42 for receiving wire connectors 16 from chamber 12 through aperture 14. Wire connector channel 42 provides a passageway whereby wire connectors 16 move towards connection chamber 44 where wires are inserted through outlet 46 and into wire connector 16 where they are secured together in wire connector 16. Spring 13 urges wire connectors 16 into wire connector channel 42 and the exiting of wire connectors 16 through outlet 46 urges the wire connectors to advance along wire connector channel 42. In an embodiment of the invention, wire connector channel 42 gradually widens towards outlet 46 such that the closed end of wire connectors 16 may align with rotator 49 and the open end of wire connectors 16 may align with outlet 46. Connection chamber 44 includes rotator 49 which grips and rotates the closed end of wire connector 16 to twistably engage and secure the ends of the wires inserted into wire connector 16. In an embodiment of the present invention, rotator 49 is a cap configured to encase and frictionally engage the closed end of wire connector 16 such that rotator 49 may rotate connector 16 when rotating means 30 is actuated.

When wire connector 16 is positioned adjacent to outlet 46, retaining means 47 such as flaps which are biased against the open end of wire connector 16 prevent wire connector 16 from exiting through outlet 46 unless sufficient force is applied to overcome the retaining force of retaining means 47. Retaining means 47 are positioned on the interior side walls of outlet 46. Similar retaining means 45 positioned outside of connection chamber 44 are biased against the closed end of wire connector 16 to prevent wire connector 16 from entering connection chamber 44 and engaging rotator 49 until sufficient force is applied to overcome the retaining force of retaining means 45.

Face plate 50 includes drill bit keyhole 52, rotator 49, a first gear 54 and a second gear 56. When drill bit 32 is inserted in drill bit keyhole 52 and drill 30 is actuated, rotation of drill bit 32 in drill bit keyhole 52 causes first gear 54 to rotate. Rotation of first gear 54 causes second gear 56 to rotate, thereby rotating rotator 49, which is mounted on second gear 56.

In an embodiment of the present invention, face plate 50 includes a wire stripper 58 which strips the ends of wires prior to being inserted into outlet 46 so that they may be secured by wire connector 16. Wire stripper 58 may be slidably mountable to a bottom end of face plate 50.

In interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. An apparatus for securing a wire connector onto a wire, said apparatus comprising:

a rotatable cylindrical member defining at least one chamber, said chamber configured to store a plurality of end-to-end wire connectors;

a frame for supporting said rotatable cylindrical member, said frame detachably mountable on a rotating means;

a dispensing housing mounted on said frame, said dispensing housing defining a wire connector channel for receiving the wire connector from said chamber and an outlet wherein the wire connector exits the apparatus; and a rotator mounted to said rotating means, said rotator for engaging the wire connector, said rotator selectively rotatable by selectively actuating of said rotating means;

wherein the wire is inserted through said outlet into the downstream-most wire connector disposed in said channel, thereby urging the wire connector to engage said rotator; and wherein actuation of said rotating means rotates said rotator to twistably engage and secure the wire onto the wire connector.

2. The apparatus of claim 1 wherein said rotatable cylindrical member defines a plurality of chambers, each of said plurality of chambers defining an aperture at a first end to releasably receive said plurality of wire connectors and each of said plurality of chambers having a first spring at a second end to urge said plurality of wire connectors from said chamber through said aperture and into said wire connector channel of said dispensing member.

3. The apparatus of claim 2 wherein said cylindrical member is selectively rotatable with respect to an axle extending centrally through said cylindrical member such that said aperture of any one of said plurality of chambers may be positioned to urge said plurality of wire connectors into said wire connector channel, said axle pivotally coupled with a rear plate of said frame at a first end and detachably coupled with an axle receiving recess defined by said dispensing housing at a second end.

4. The apparatus of claim 3 further comprising a second spring encompassing said axle, said second spring attached to said rear plate at a first end and attached to a first side of a disc at a second end wherein said axle journals through said disc such that a second side of said disc is firmly biased against a rear surface of said cylindrical member when said second spring is expanded, said second spring thereby exerting force against said cylindrical member.

5. The apparatus of claim 4 further comprising a plurality of bearings positioned on said rear surface of said cylindrical member, said plurality of bearings frictionally engageable with a plurality of corresponding receiving recesses defined by said second side of said disc.

6. The apparatus of claim 5 wherein said plurality of bearings are displaceable from said plurality of corresponding receiving recesses when force is applied to rotate said cylindrical member, said plurality of bearings frictionally re-engageable with said plurality of corresponding receiving recesses when said aperture of one of said plurality of chambers is aligned with said wire connector channel.

7. The apparatus of claim 6 wherein when said second spring is expanded, force exerted by said second spring against said cylindrical member secures said second end of said axle within said axle receiving recess such that said aperture of one of said plurality of chambers is aligned with said wire connector channel of said dispensing housing to receive said plurality of wire connectors.

8. The apparatus of claim 7 wherein when said second spring compresses, said second end of said axle is releasable from said axle receiving recess thereby enabling said axle to pivot about said first end of said axle such that said cylindrical member may be displaced to enable insertion of said plurality of wire connectors into said plurality of chambers.

9. The apparatus of claim 8 wherein a retractable shutter positioned over each of said aperture of said plurality of chambers retains said plurality of wire connectors disposed within said plurality of chambers when said rotatable cylindrical member is displaced, said retractable shutter retracting when said axle re-engages said axle receiving recess, thereby enabling said first spring to urge said plurality of wire connectors into said wire connector channel.

10. The apparatus of claim 9 wherein said frame comprises a cylinder support for supporting said cylindrical member and a first and a second securing means, said cylinder support connected to said rear plate at a first end and a face plate at a second end such that said frame may be detachably mountable on said rotating means by said first and said second securing means.

11. The apparatus of claim 10 wherein said first and said second securing means comprises adjustable clamps for securing said frame onto said rotating means.

12. The apparatus of claim 11 wherein said rotating means is a drill having a drill bit insertable in a drill bit keyhole defined by said face plate.

13. The apparatus of claim 12 wherein said dispensing housing is connected to said face plate such that said rotator may engage said plurality of wire connectors advancing through said wire connector channel, said wire connector channel widening towards said outlet such that said wire connectors may be aligned to receive the wire and engage said rotator.

14. The apparatus of claim 13 wherein said rotator is a cap connected with said face plate, said rotator configured to encase and frictionally engage a closed end of the wire connector such that said rotator may rotate the wire connector to secure the wire when said rotating means is actuated.

15. The apparatus of claim 14 wherein when said drilling means is actuated, rotation of said drill bit inserted in said drill bit keyhole rotates a first gear, said first gear causing a second gear to rotate, said rotator mounted on said second gear thereby rotating said rotator.

16. The apparatus of claim 15 further comprising a wire stripper, said wire stripper slidably mounted on a bottom end of said face plate to strip an end of the wire.

17. An apparatus for securing a wire connector onto a wire, said apparatus comprising:

a rotatable cylindrical member defining a plurality of chambers configured to store a plurality of wire connectors, each of said plurality of chambers defining an aperture at a first end to releasably receive said plurality of wire connectors and each of said plurality of chambers having a first spring at a second end to urge said plurality of wire connectors from said chamber through said aperture;

a frame for supporting said rotatable cylindrical member, said frame detachably mountable on a rotating means;

a dispensing housing mounted on said frame, said dispensing housing defining a wire connector channel for receiving said plurality of wire connectors from said plurality of chambers and an outlet wherein said plurality of wire connectors exits the apparatus;

said cylindrical member selectively rotatable with respect to an axle extending centrally through said cylindrical member such that said aperture of any one of said plurality of chambers may be positioned to urge said plurality of wire connectors into said wire connector channel, said axle pivotally coupled with a rear plate of said frame at a first end and detachably coupled with an axle receiving recess defined by said dispensing housing at a second end;

a second spring encompassing said axle, said second spring attached to said rear plate at a first end and attached to a first side of a disc at a second end wherein said axle journals through said disc such that a second side of said disc is firmly biased against a rear surface of said cylindrical member when said second spring is expanded, said second spring thereby exerting force against said cylindrical member;

a plurality of bearings positioned on said rear surface of said cylindrical member, said plurality of bearings frictionally engageable with a plurality of corresponding receiving recesses defined by said second side of said disc; and a rotator mounted to said rotating means, said rotator configured to encase and frictionally engage a closed end of said plurality of wire connectors such that said rotator may rotate said plurality of wire connectors to secure the wire, said rotator selectively rotatable by selectively actuating said rotating means;

wherein the wire is inserted through said outlet into the downstream-most wire connector disposed in said housing, thereby urging the wire connector to engage said rotator; and wherein actuation of said rotating means rotates said rotator to twistably engage and secure the wire onto the wire connector.

18. The apparatus of claim 17 wherein said plurality of bearings are displaceable from said plurality of corresponding receiving recesses when force is applied to rotate said cylindrical member, said plurality of bearings frictionally re-engageable with said plurality of corresponding receiving recesses when said aperture of one of said plurality of chambers is aligned with said wire connector channel.

19. The apparatus of claim 18 when said second spring is expanded, force exerted by said second spring against said cylindrical member secures said second end of said axle within said axle receiving recess such that said aperture of one of said plurality of chambers is aligned with said wire connector channel of said dispensing housing to receive said plurality of wire connectors.

20. The apparatus of claim 19 wherein when said second spring compresses, said second end of said axle is releasable from said axle receiving recess thereby enabling said axle to pivot about said first end of said axle such that said cylindrical member may be displaced to enable insertion of said plurality of wire connectors into said plurality of chambers.

* * * * *